Figure 1:
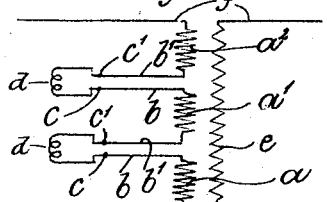

J. GOODMAN.
ELECTRICAL APPARATUS HAVING WINDINGS.
APPLICATION FILED NOV. 20, 1917.

1,390,779.

Patented Sept. 13, 1921.

Inventor.
Joseph Goodman,
By A. S. Pattison,
Atty.

UNITED STATES PATENT OFFICE.

JOSEPH GOODMAN, OF HAYES, ENGLAND.

ELECTRICAL APPARATUS HAVING WINDINGS.

1,390,779.  Specification of Letters Patent.  Patented Sept. 13, 1921.

Application filed November 20, 1917. Serial No. 202,955.

*To all whom it may concern:*

Be it known that I, JOSEPH GOODMAN, a subject of the King of Great Britain and Ireland, residing at Hayes, in the county of Middlesex, England, have invented Improvements in or Relating to Electrical Apparatus Having Windings, of which the following is a specification.

This invention has reference to electrical apparatus of various kinds having windings designed to be operated at fixed voltages and also to apparatus having windings designed to be operated at different times at different voltages. In windings of apparatus of the first kind, and in part or parts of windings of apparatus of the second kind that is or are for the time being out of use, electrical stresses of high value are liable to be set up through various causes, including local resonance occasioned by electrical disturbances and surges and by internal reflections of such disturbances and surges and which stresses sometimes cause breakdown of the apparatus.

Thus, in transformers, which may be taken as an example of apparatus of the kind referred to, it may occur that owing to the capacity and inductance values of one of the windings, say for example the primary windings, designed to be operated at a fixed voltage, internal reflection or local resonance, or internal reflections and local resonance, may arise in such windings and cause its breakdown.

Similarly, in the case of a winding of a transformer, frequently the primary winding, designed to be operated at different times at different voltages and wherein for this purpose a part or parts of such windings is or are arranged to be put out of action, being for this purpose partly or completely disconnected from the circuit, it may happen that when the main portion of the winding is in action, an electro-static stress, due for instance to an electric surge or the like, may be set up of such proportion in the partly or wholly disconnected part or parts of the winding as to break down the insulation thereof.

Now the present invention has reference to an improved method of and means for avoiding the disadvantage above referred to.

For this purpose according thereto there is interposed at one or more points in the length of the winding in apparatus of the first mentioned kind, or, in apparatus of the secondly mentioned kind, between the main portion of the winding that is in circuit and the part or parts of the winding that is or are disconnected, and also it may be between each adjacent pair of such parts, where such exist, protective means adapted to prevent or arrest the passage therethrough of undue electric stresses and comprising for instance one or more inductances, such for instance as choking coils, or one or more capacities, such for instance as condensers, or one or more inductances and one or more capacities connected in parallel or in series, the said protective means being external to the actual winding and connected to tappings brought out therefrom for the purpose at the desired points.

In the first case, in which the total or full load has to pass through the protective means connecting the active parts of the winding together, the inductance or capacity, or inductance and capacity connected in parallel or series, should be of such value as to allow of the normal full load passing through it or them but not of excessive loads. It should also be of such a value that, in conjunction with the computed values of the inductance and capacity of the windings, adjacent to the tapping terminals to which the device is connected, the possibility of damage to the winding due to causes such as those mentioned, will be rendered very small.

In the second case, the inductance or capacity, or inductance and capacity connected in parallel or series should be of such value that in conjunction with the computed values for the inductance and capacity of the disconnected part or parts of the winding that is or are for the time being inoperative, the possibility of damage to such disconnected part or parts of the winding, due to causes such as those mentioned, will be rendered very small. In this case, the protective means although connected to the active portion of the winding through a terminal or tapping connected thereto, will nevertheless be outside the circuit of such active portion of the winding and will therefore normally not be traversed by current, or only a very small one.

It will be understood that although the inductance or choking coil referred to acts also as a resistance, it may be necessary in certain instances to increase such resistance by the addition of a separate non-inductive resistance. Also that where a capacity or condenser is connected in the circuit, a resistance is present in series with the same (due to the connections) and it may be necessary in some cases to increase this resistance by the addition of a non-inductive resistance of prescribed value.

When in protective means of the kind referred to, an inductance and a capacity are connected in parallel, an inductance or a resistance may be arranged in series with the capacity.

Protective means according to the invention can be applied to the windings of apparatus of various kinds liable to be subjected temporarily to dangerous electrical stresses such as those referred to, so that the invention is widely applicable.

Figure 2:
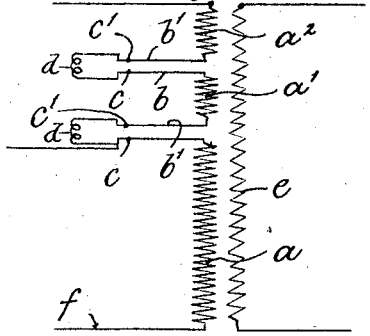

In the accompanying illustrative drawings, Figure 1 shows diagrammatically, the application of the invention to electrical apparatus of the kind first herein referred to and Fig. 2 is a similar view showing it applied to electrical apparatus of the kind secondly herein referred to, the electrical apparatus in each case being represented as a static transformer. Figs. 3, 4, 5 and 6 are diagrams showing modified constructions of the protective means.

In Fig. 1, $a$, $a^1$, $a^2$ are sections of the primary winding of the transformer from adjacent ends of which extend to the exterior of the transformer, tappings $b$, $b^1$ to terminals $c$ $c^1$ between each pair of which is connected an inductance $d$, such as a choking coil, the several choking coils connecting the several sections of the winding in series. $e$ is the secondary winding of the transformer. $f'$ and $g'$ are the current supply leads across which the said sections of the primary winding are connected.

In Fig. 2, $a$, $a^1$, $a^2$ are the sections of the primary winding of the transformer of which only one or some may be in use at any given time according to the voltage to be produced in the secondary winding $e$. In the example, only the section $a$ is connected up to the mains $f$ and $g$ for use. In this case also, tappings $b$, $b^1$ extend from the adjacent ends of adjacent sections of the winding to terminals $c$ $c^1$ between each pair of which an inductance $d$, such as a choking coil, is connected as shown.

Figure 3:
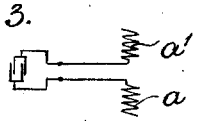
Figure 4:
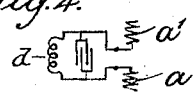
Figure 5:
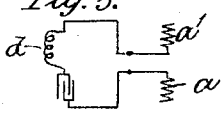
Figure 6:
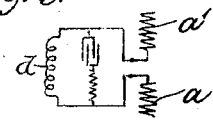

Fig. 3 shows a condenser as the protective means connected between adjacent sections of the winding; Fig. 4 shows a choking coil and a condenser connected in parallel between adjacent sections of winding; Fig. 5 shows a condenser and choking coil connected in series between the adjacent sections and Fig. 6 shows a choking coil and condenser connected in parallel between the adjacent sections of winding with a choking coil in series with the condenser, these protective means being made of suitable value in each case, as hereinbefore described, to suit the winding with which they are used.

What I claim is:—

1. In electrical apparatus, a pair of winding sections and electric stress quenching means alone connecting said sections in direct series relationship, there being consequently no circuit between the sections except that due to the said quenching means.

2. In electrical apparatus, the combination with a pair of winding sections of electric stress quenching means possessing inductance arranged to alone connect said sections in direct series relationship, there being consequently no circuit between the sections except that due to the said quenching means.

3. In electrical apparatus, the combination with a pair of winding sections of electric stress quenching means comprising an inductance device and a capacity arranged to alone connect the said sections in direct series relationship, there being consequently no circuit between the sections except that due to the inductance device and capacity.

4. In electrical apparatus, the combination with a pair of winding sections of electric stress quenching means comprising an inductance device and a capacity connected in parallel with one another and arranged to alone connect the said sections in direct series relationship, there being consequently no circuit between the sections except that due to the said inductance device and capacity.

5. In electrical apparatus, the combination with a pair of winding sections of electric stress quenching means comprising an inductance device, and, in parallel therewith, a series connected capacity and inductance, the said quenching means being arranged to alone connect the said sections in direct series relationship, there being consequently no circuit between the sections except that due to the said quenching means.

6. In a static transformer, a winding connected at its ends to terminal connections and divided into sections, two tappings brought out from the ends of adjacent sections and electric stress quenching means connected to and between said tappings and alone connecting said sections through said tappings in direct series relationship, there being consequently no circuit between the sections except that due to said quenching means.

7. In a static transformer, a primary winding connected at its ends to terminal connections and divided into sections, pairs of tappings brought out from the ends of adjacent sections of the winding, electric stress quenching means connected to and between said tappings and alone connecting said sections through said tappings in direct series relationship, there being consequently no circuit between the sections except that due to said quenching means, and an intermediate connection for a main between one end of one of the sections of winding and the adjacent end of the stress quenching means.

Signed in London, England, this 5th day of November, 1917.

JOSEPH GOODMAN

Witnesses:
 FREDERICK WILLIAM YOUNGH,
 DOROTHY CONSTANCE BENWELL.